(12) United States Patent
Mitsumoto

(10) Patent No.: US 6,321,176 B1
(45) Date of Patent: Nov. 20, 2001

(54) PITCH ANGLE CALCULATING DEVICE FOR VEHICLE

(75) Inventor: Yoshihiro Mitsumoto, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/225,492

(22) Filed: Jan. 6, 1999

(30) Foreign Application Priority Data

Jan. 6, 1998 (JP) .................................................. 10-001030
Aug. 26, 1998 (JP) .................................................. 10-240178

(51) Int. Cl.[7] ..................................................... G01C 9/06
(52) U.S. Cl. ............................................. 702/151; 362/459
(58) Field of Search ............................... 702/151; 315/82; 362/459, 460, 464, 465, 466, 467

(56) References Cited

U.S. PATENT DOCUMENTS

| | | | |
|---|---|---|---|
| 4,037,134 | * 7/1977 | Loper | 315/78 |
| 4,194,235 | * 3/1980 | Heinlein | 362/38 |
| 4,197,491 | * 4/1980 | Cunnell et al. | 318/673 |
| 4,204,270 | * 5/1980 | Poirier | 362/71 |
| 4,533,860 | * 8/1985 | Saito | 318/673 |
| 4,620,267 | * 10/1986 | Cibie | 362/71 |
| 4,968,896 | * 11/1990 | Shibata et al. | 307/10.8 |
| 5,182,460 | * 1/1993 | Hussman | 307/10.8 |
| 5,560,431 | * 10/1996 | Stratton | 172/2 |
| 5,692,707 | * 12/1997 | Smay | 244/165 |
| 5,877,680 | * 3/1999 | Okuchi et al. | 340/468 |

FOREIGN PATENT DOCUMENTS

| | | |
|---|---|---|
| 31 10 094 | 9/1982 | (DE) . |
| 38 39 427 | 5/1990 | (DE) . |
| 92 03 903 | 7/1992 | (DE) . |
| 43 11 669 | 10/1994 | (DE) . |
| 196 31 525 | 3/1997 | (DE) . |
| 197 22 717 | 12/1997 | (DE) . |

* cited by examiner

*Primary Examiner*—Marc S. Hoff
*Assistant Examiner*—Edward Raymond
(74) *Attorney, Agent, or Firm*—Foley & Lardner

(57) ABSTRACT

A pitch angle calculating device includes height detecting units arranged in front and rear positions of the vehicle for detecting front and rear vehicle heights and a calculating section for calculating a pitch angle of the vehicle by the vehicle heights and a distance between the front position and the rear position. In the device, the pitch angle is divided into a plurality of pitch angle ranges $\theta 0 \sim \theta 1, \theta 1 \sim \theta 2, \theta 3 \sim \theta 4, \ldots$, the calculating section integrates periods residing in each pitch angle range and subsequently determines the pitch angle of the vehicle on a basis of the integrated periods referred as "residence time". With the calculation, it is possible to avoid instantaneous changes in pitch angle due to the vehicle's getting over irregularities and obstacles on a road.

16 Claims, 10 Drawing Sheets

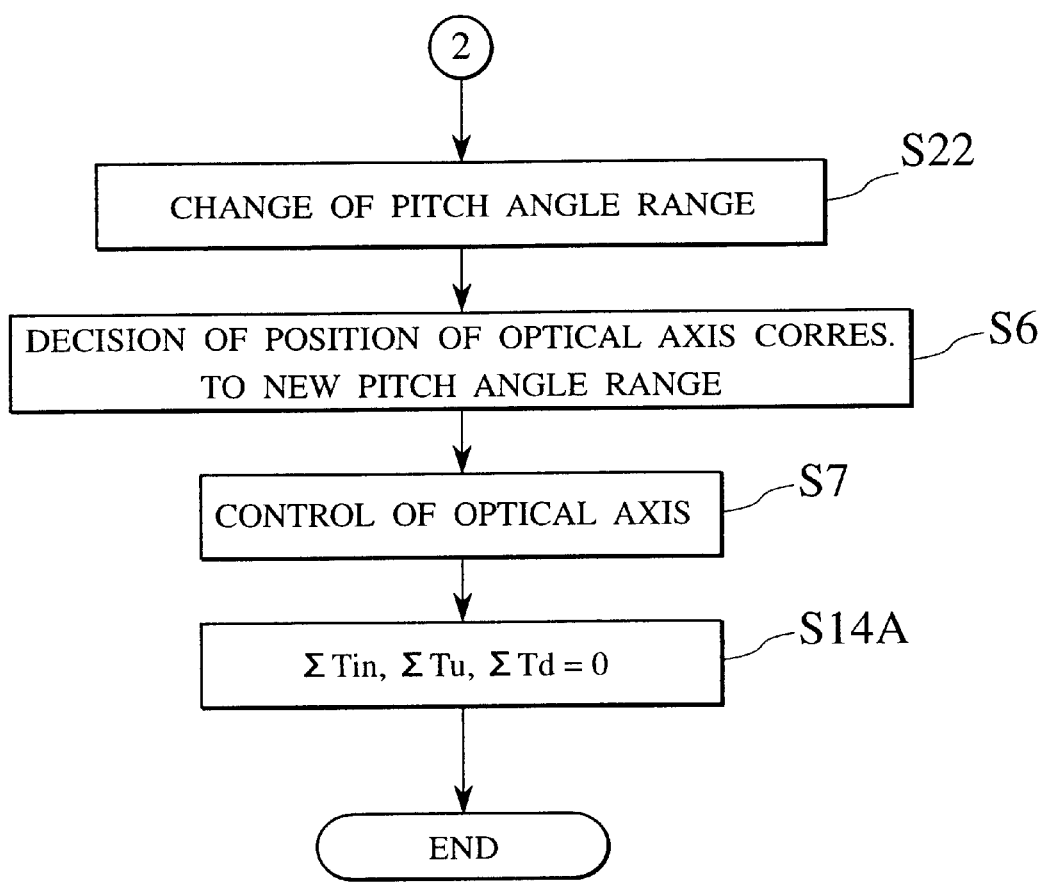

PITCH ANGLE CALCULATING DEVICE FOR VEHICLE

BACKGROUND OF THE INVENTION

1. Field of the Invention

The present invention relates to a device for calculating a pitch angle for a vehicle.

2. Description of the Related Art

In general, the pitch angle θ for a vehicle is calculated by the following expression:

$$\theta = \tan^{-1}\frac{hf - hr}{w} \quad (1)$$

where hf is a vehicle height at a front wheel, hr is a vehicle height at a rear wheel, and w is a wheel base length.

It is noted that in the above expression (1), changes from respective heights under the vehicle's initial condition, which will be referred as "initial values" hereinafter, are entered into the vehicle heights hf, hr, respectively. Accordingly, the pitch angle θ of the vehicle under the initial condition is equal to an angle of zero (0) degree.

Now, in the vehicle height, there are a long-sustained variation derived from a number of passengers, a position of passengers, a weight of loads and a position of loads, and an instantaneous variation due to an acceleration (or deceleration) of the vehicle, the vehicle's getting over the irregularities and obstacles on the road and so on. The former variation in vehicle height produces a long-term pitch angle, while the latter variation in vehicle height produces an instantaneous (short-term) pitch angle. Therefore, if the pitch angle is calculated on the basis of a detected vehicle height including the latter instantaneous variation in vehicle height, then a pitch angle obtained as a calculation result will change furiously, which is undesirable for using it in an automatic control of leveling a headlamp of the vehicle, namely, "auto-levelizer".

SUMMARY OF THE INVENTION

It is therefore an object of the present invention to provide a pitch angle calculating device which is capable of calculating a right and reliable pitch angle suitable for the use in such a control while restricting an occurrence of unnecessary pitch angles due to the vehicle's getting over the irregularities and obstacles etc. on the road.

In the first aspect of the invention, the above-mentioned object of the present invention can be accomplished by a pitch angle calculating device for a vehicle, comprising:

height detecting units arranged both in a front position (Pf) and in the rear position (Pr) of the vehicle, for detecting a vehicle height (hf) of the front position and a vehicle height (hr) of the rear position (Pr); and a calculating section for calculating a pitch angle of the vehicle by the vehicle heights (hf, hr) and a distance between the front position (Pf) and the rear position (Pr);

wherein, on condition that the pitch angle is divided into a plurality of pitch angle ranges, the calculating section integrates periods residing in each pitch angle range and subsequently determines the pitch angle of the vehicle on a basis of the integrated periods referred as "residence time".

In the second aspect of the invention, the above-mentioned object of the present invention can be also accomplished by a pitch angle calculating device for a vehicle, comprising:

a height detecting unit arranged in either one of a front position (Pf) and the rear position (Pr) of the vehicle, for detecting either a vehicle height (hf) of the front position or a vehicle height (hr) of the rear position (Pr); and a calculating section for calculating a pitch angle of the vehicle by the vehicle heights (hf, hr) and a distance between the front position (Pf) and the rear position (Pr);

wherein, on conditions that the other of the vehicle heights (hf or hr) is established by a fixed value and that the pitch angle is divided into a plurality of pitch angle ranges, the calculating section integrates periods residing in each pitch angle range and subsequently determines the pitch angle of the vehicle on a basis of the residence time.

The above and other features and advantages of this invention will become apparent, and the invention itself will best be understood, from a study of the following description and appended claims, with reference to the attached drawings showing, some preferred embodiments of the invention.

BRIEF DESCRIPTION OF THE DRAWINGS

FIG. 10 is a remaining part of the flow chart showing the optical axis control program in accordance with the fourth modification of the embodiment.

DESCRIPTION OF THE PREFERRED EMBODIMENT

We now describe one embodiment in which the present invention is applied to an automatic headlamp leveling apparatus, which is commonly called "headlamp autolevelizer". Nevertheless, the present invention is applicable to not only headlamp auto-levelizer but all of the apparatus that executes the control based on the pitch angle.

Figure 1:
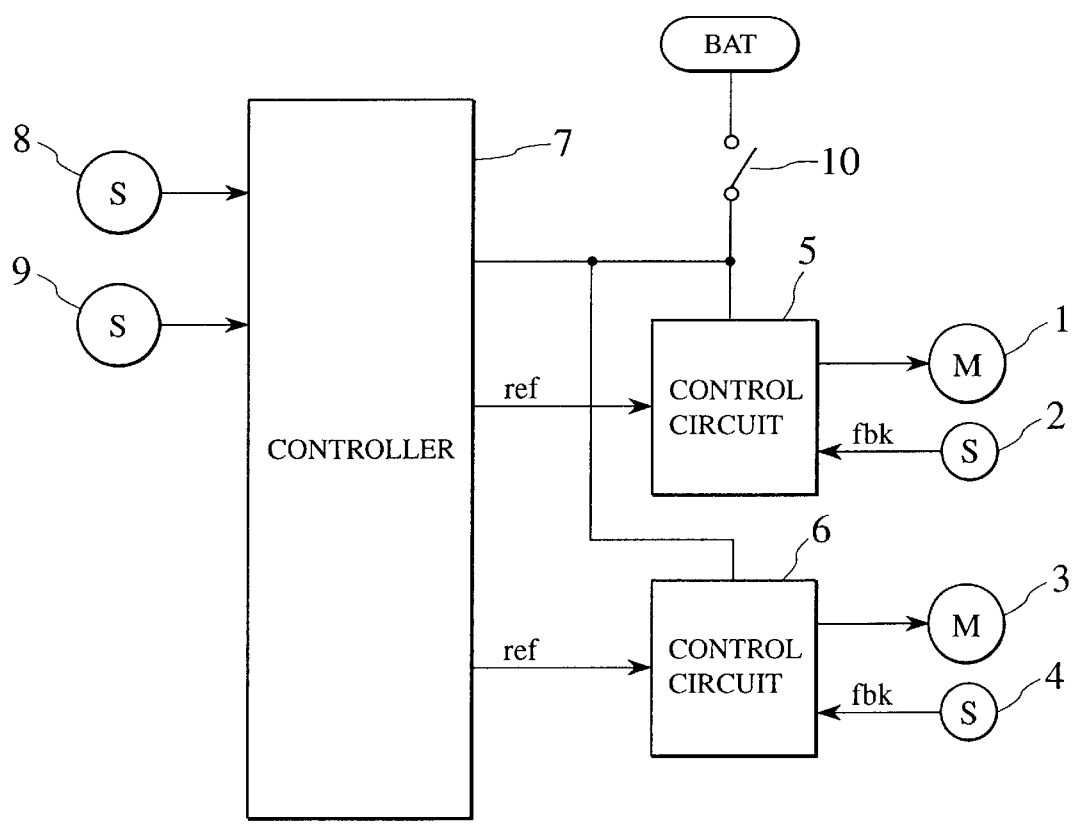
FIG. 1 is a diagram showing a constitution of a pitch angle calculating device in accordance with an embodiment of the present invention.

In FIG. 1, reference numeral 1 designates a motor which rises and falls an optical axis of a right headlamp (not shown). A position sensor 2 is provided for detecting a position of the optical axis of the right headlamp. Similarly, reference numeral 3 designates a motor which rises and falls an optical axis of a left headlamp (also not shown). A position sensor 4 is provided for detecting a position of the optical axis of the left headlamp. Note, any type of headlamp, for example, a shield-type headlamp, a semi-shield type headlamp or the like will do as the headlamp of the invention. Further, as to the detailed method of adjusting the optical axis of the headlamp, a reflector for the headlamp may be tilted. Alternatively, a headlamp assembly may be tilted. In order to control the optical axis of the right headlamp, a control circuit 5 controls the drive of the motor 1 on the basis of an "optical axis position" command signal ref outputted from a controller 7 and an "optical axis position" feedback signal fbk outputted from the position sensor 2. In order to control the optical axis of the left headlamp, a control circuit 6 controls the drive of the motor 3 on the basis of an "optical axis position" command signal ref outputted from a controller 7 and an "optical axis position" feedback signal fbk outputted from the position sensor 4.

The controller 7 is composed of a micro-computer and its peripheral components and carries out a calculation of the pitch angle and a positional control for the optical axes of the headlamps, on the execution of a control program described later. A height sensor 8 attached to a suspension arm for a right-hand front wheel detects an arm angle and also converts it into the vehicle height hf at a position of the right-hand front wheel. A height sensor 9 attached to a suspension arm for a right-hand rear wheel detects an arm angle and also converts it into the vehicle height hr at a position of the right-hand rear wheel. When a not-shown ignition key is turned to its ON position, then an ignition switch 10 closes to supply a battery power source BAT to the control circuits 5, 6.

Next, we describe a method of calculating the pitch angle in accordance with the embodiment.

Respectively regarding outputs of the height sensors 8, 9 under the vehicle's initial condition as the initial values hfo, hro of the vehicle heights hf, hr, the controller 7 calculates the pitch angle θ on the basis of changes from the initial values hfo, hro by the following expression:

$$\theta = \tan^{-1} \frac{(hf - hf0) - (hr - hr0)}{w} \quad (2)$$

Here, respectively established as the initial height values hfo, hro are the outputs of the height sensors, both of which are generated under a proper measuring condition, such as a situation where a finished vehicle after assembling is set on a horizontal surface plate. Alternatively, it is executed under such a regular measuring condition to measure outputs of the height sensors of the plural vehicles of the same kind and sequent calculate the averages of the outputs. After that, the so-obtained averages will be employed as the initial height values hfo, hro of the same vehicle kind, thereby abolishing to initialize the initial height values for every vehicle.

Note, a low-pass filtering is not applied to the height values hf, hr obtained by the height sensors 8, 9, while the low-pass filtering is applied to the pitch angle θ calculated on the basis of the height values hf, hr. Because, if the height values hf, hr are subjected to the low-pass filtering, it is impossible to cancel height variations generated with a phase difference between the front sensor 8 and the rear sensor 9 when the vehicle is getting over the irregularities and obstacles etc. on the road, thereby producing an undesirable pitch angle caused due to such height variations. On the contrary, if the calculation result of the pitch angle θ is subjected to the low-pass filtering, then it is possible to delete the instantaneous pitch angle produced due to variations of the heights hf, hr detected during the vehicle's getting over the irregularities and obstacles on the road.

Figure 2:
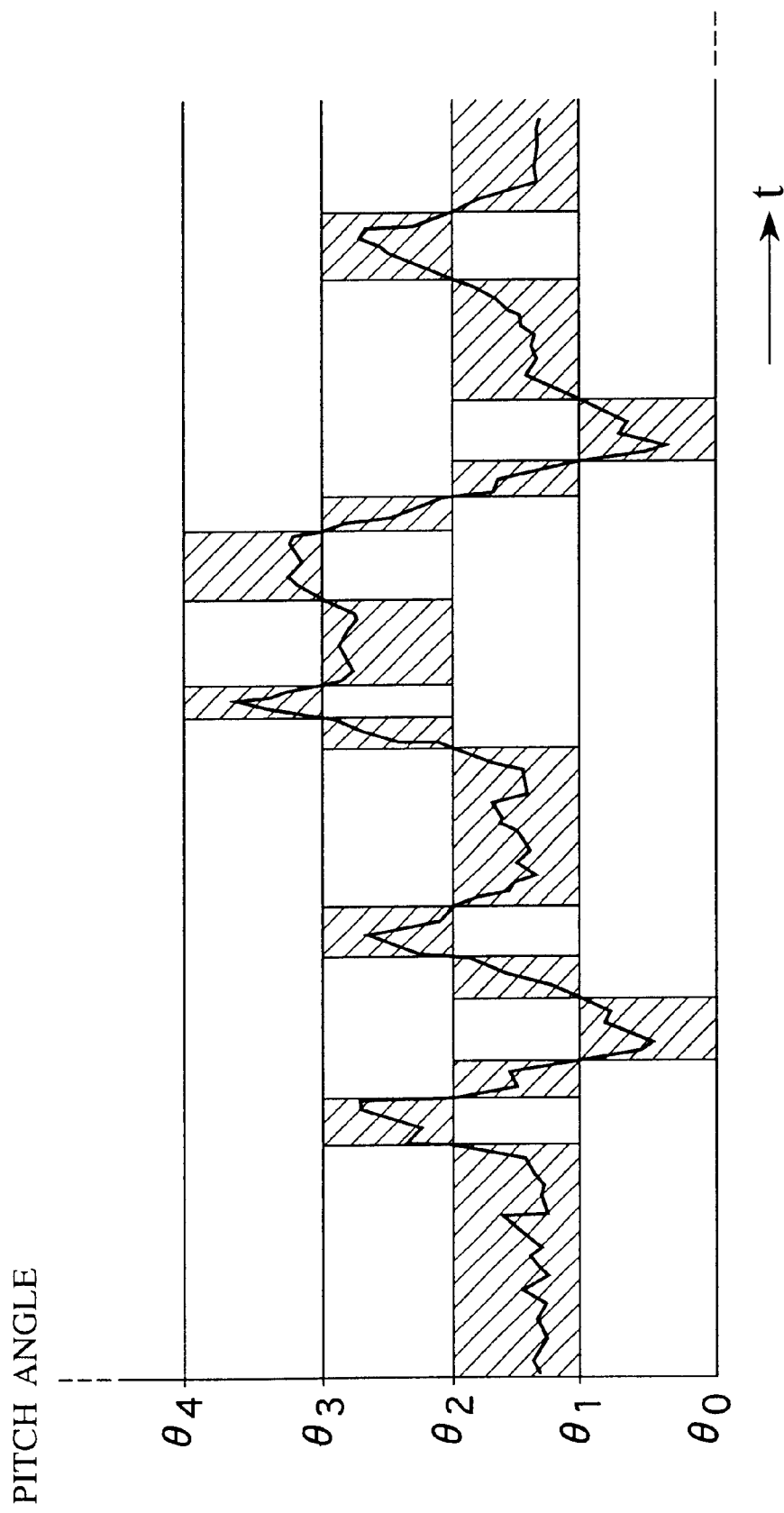
FIG. 2 is a diagram illustrating an example of a variable pitch angle, for explanation of a pitch angle calculating method in accordance with the embodiment of the present invention.

Next, as shown in FIG. 2, the pitch angle of the vehicle is divided into a plurality of ranges θ0~θ1, θ1~θ2, θ2~θ3, θ3~θ4 . . . , and respective periods staying in each range (called as "residence time"hereinafter) are integrated in succession. Note, the dividing method for the pitch angle θ is determined on the basis of an object to be controlled, for example, the resolving power of the headlamp auto-levelizer in this embodiment. Note, the integration period of the residence time may be established by a period from the beginning of optical-axis control till the present sampling point or a period from the present sampling point till a predetermined time in the past. Alternatively, the integration period of the residence time may be established by a period from the previous change of a range of pitch angle till the present sampling point. In this specification, the residence time in the range θ0~θ1 of FIG. 2 is expressed by T01. Similarly, the ranges θ1~θ2, θ2~θ3, θ3~θ4 . . . will be expressed by T12, T23, T34 . . . . respectively.

Basically, a "pitch angle" range having the longest residence time is representative of the present pitch angle range of the vehicle. In spite of such an establishment of the "pitch angle" range having the longest residence time as the present pitch angle range, however, there is remained a possibility that the pitch angle range changes frequently when the pitch angle varies furiously. Therefore, according to the embodiment, a hysteresis error is anticipated in changing one pitch angle to another pitch angle. For example, providing that the "pitch angle" range θ1~θ2 is selected for the present pitch angle range and when the residence time T23 of the other range θ2~θ3 gets longer than the residence time T12 of the range θ1~θ2, the "pitch angle" range θ1~θ2 will be changed to the range θ2~θ3 on condition that a difference ΔT between the time T23 and the time T12 exceeds a threshold value Ts.

Besides, it should be noted that when the vehicle is accelerated or decelerated, then a front part of the vehicle does rise or sink. When adjusting the optical axis of the headlamp to be constant on the basis of the calculated pitch angle θ and when the front part of the vehicle rises, there is no problem in driving since the resulting raised optical axis allows the irradiation area of headlamps to be enlarged. On the contrary, when the front part of the vehicle sinks, then the optical axis is lowered to narrow the front irradiation area. Therefore, in such a case, it has to lower the optical axis immediately in order to ensure the wide irradiation area of headlamps.

In this way, it is desirable to alter change-over hysteresis of the pitch angle range in both cases that the pitch angle increases and decreases, depending on the object to be controlled.

Thus, according to the embodiment, a threshold value in case of changing the pitch angle range to its increased side is expressed by Tsu, while a threshold value in case of changing the pitch angle range to its decreased side is expressed by Tsd and a relationship that Tsu is larger than Tsd (i.e. Tsu>Tsd) is established.

Figure 3:
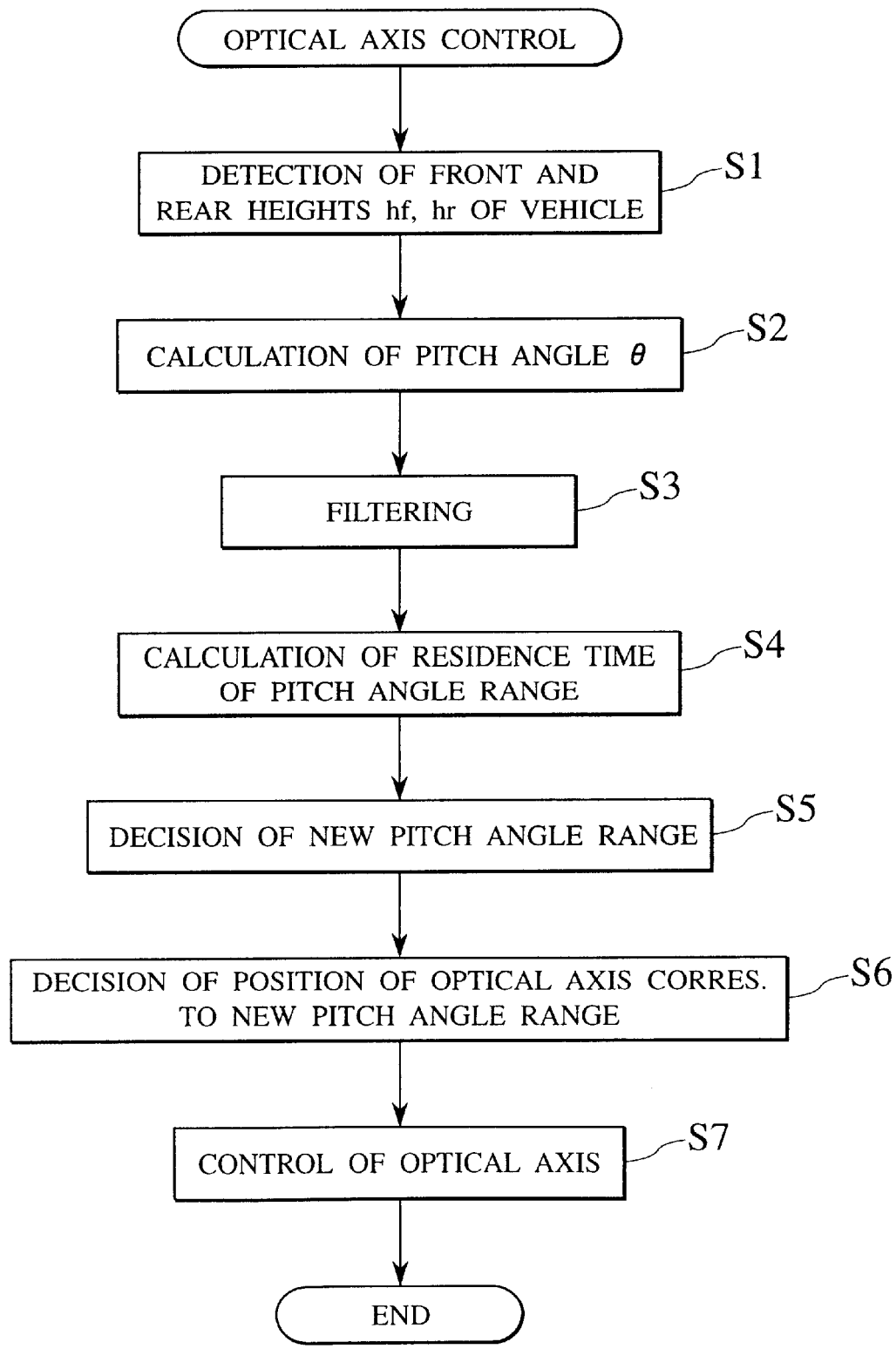
FIG. 3 is a flow chart showing an optical axis control program in accordance with the embodiment of the invention.

FIG. 3 is a flow chart showing a program for controlling the optical axis. With reference to this flow chart, we now describe an operation of the device in accordance with the embodiment.

The controller 7 executes the optical axis control program at predetermined intervals. At step S1, it is executed to detect the vehicle heights hf, hr by the vehicle height sensors 8, 9. Next, at step S2, it is executed to calculate the pitch angle θ by the expression (2) on the basis of the vehicle heights hf, hr and their preset initial values hfo, hro. At step S3, the calculated pitch angle θ is subjected to a low-pass filtering in order to delete variations in detected vehicle heights at the time of the vehicle's getting over the irregularities and obstacles on the road and changes in pitch angle derived from noise mixed with the outputs of the vehicle height sensors 8, 9.

At step S4, it is executed in the preset pitch angle ranges to calculate the residence time of the pitch angle range in which the pitch angle θ calculated in the present routine is included. Note, the residence time in this routine corresponds to a period from the previous sampling time up to the present sampling time. Therefore, the residence time in this routine is added to the residence time integrated by the previous routine. At sequent step S5, a new pitch angle range is determined on the basis of the present pitch angle, the residence time of each pitch angle range, and the threshold values Tsu and Tsd for changing the pitch angle range. Then, at step S6, it is executed to determine the positions of the optical axes of the headlamps corresponding to the new pitch angle range and finally, the routine goes to step S7 where the optical axes are controlled by the control circuits 5, 6.

1st. Modification of the Embodiment

In the above-mentioned embodiment, there has been described one example of the optical axis control where variations in pitch angle at the vehicle's accelerating or decelerating are taken into consideration. Now, we describe a modification of the optical axis control where the pitch angle depending on the numbers and positions of passengers on the vehicle or the loads and positions of goods is to calculated, excluding the pitch angle at the vehicle's accelerating or decelerating.

Figure 4:
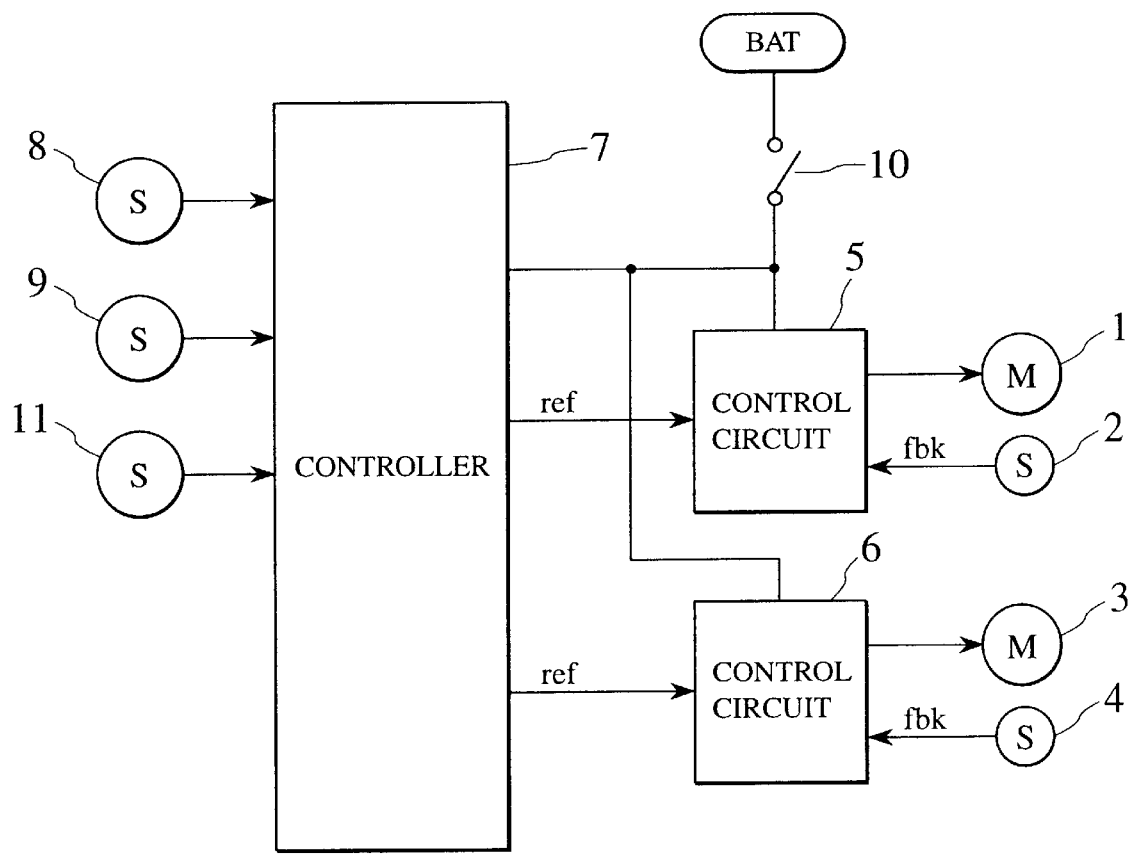
FIG. 4 is a diagram showing a constitution of a pitch angle calculating device in accordance with a first modification of the embodiment.

FIG. 4 shows the constitution of the control device in the modification.

In this modification, an acceleration sensor 11 for detecting forward and backward accelerations of the vehicle is incorporated in the control device of FIG. 1. In FIG. 4, elements similar to those of the control device of FIG. 1 are indicated by the same reference numerals, respectively and their descriptions are deleted.

Figure 5:
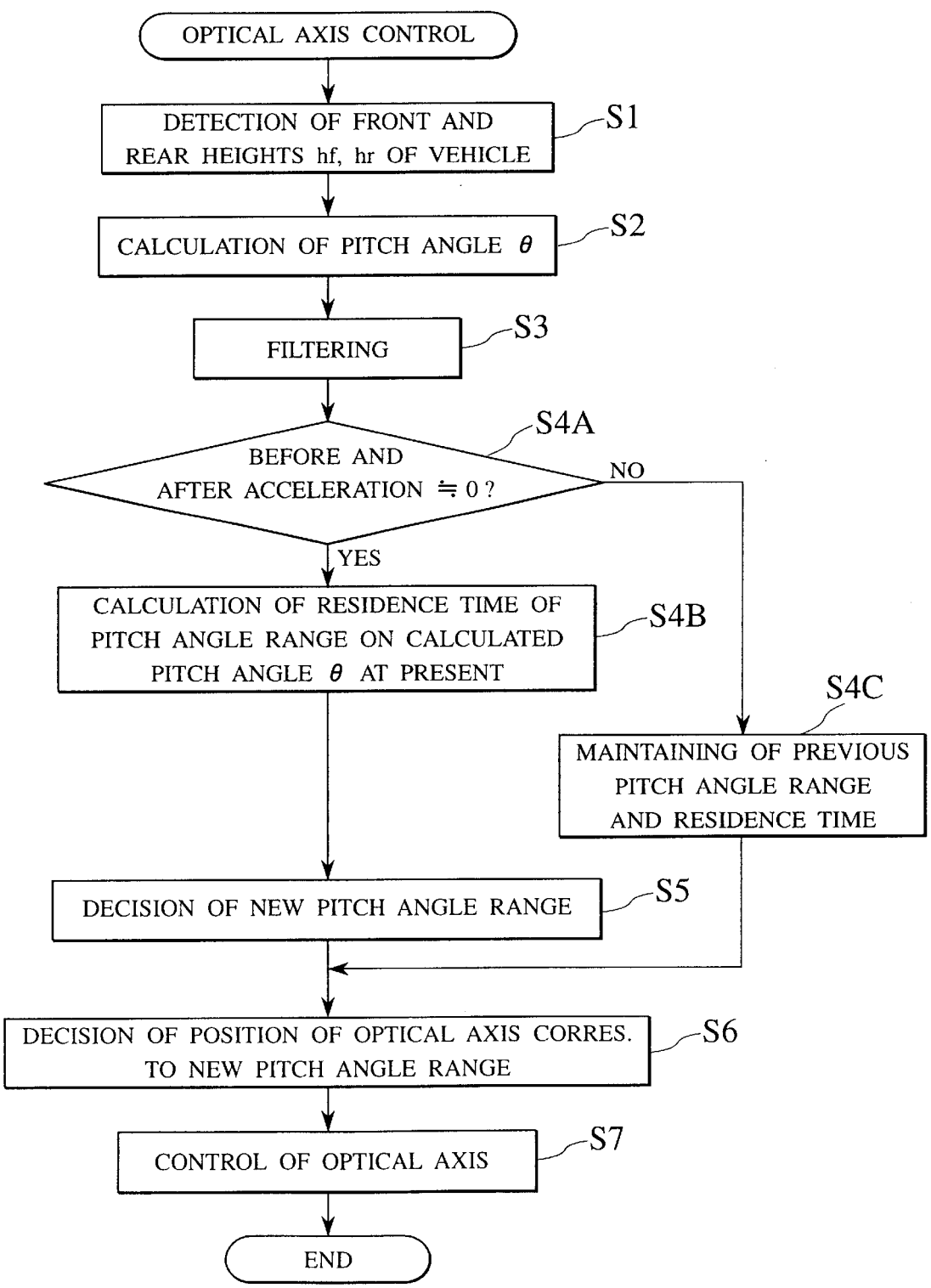
FIG. 5 is a flow chart showing an optical axis control program in accordance with the first modification of the embodiment.

FIG. 5 is a flow chart showing the optical axis control program of the modification. Note, in FIG. 5, some steps to execute processes similar to those of the steps in the control program of FIG. 3 are indicated by the same step numbers, respectively and differences between the former program and the latter program will be described.

At steps S1 to S3, it is executed to calculate the pitch angle θ on the basis of the vehicle heights hf, hr and the initial values hfo, hro and apply the low-pass filtering on the calculated pitch angle θ. At next step S4A, it is judged whether or not the forward and backward acceleration detected by the acceleration sensor 11 is substantially equal to zero. When the forward and backward acceleration is substantially equal to zero, then the routine goes to step S4B, judging that the vehicle is not under the accelerated or decelerated condition at present. At step S4B, it is executed to calculate the residence time of the pitch angle range where the pitch angle θ calculated in this routine is included, in the preset pitch angle ranges. Note, the residence time in this routine corresponds to a period from the previous sampling time up to the present sampling time. Therefore, the residence time in this routine is added to the residence time integrated by the previous routine. At sequent step S5, a new pitch angle range is determined on the basis of the present pitch angle, the residence time of each pitch angle range, and the threshold values Tsu and Tsd for changing the pitch angle range.

While, if the acceleration is not substantially equal to zero, the routine goes to step S4C where the current pitch angle range is not changed to maintain the pitch angle determined in the previous routine, judging that the vehicle is not accelerating or decelerating. Then, the residence time of the pitch angle range in the previous routine is renewed. At step S6, it is executed to determine the positions of the optical axes of the headlamps corresponding to the new pitch angle range and finally, the routine goes to step S7 where the optical axes are controlled by the control circuits 5, 6.

As to the constitution of the above-mentioned embodiment, it will be understood that the vehicle height sensors 8, 9 corresponds to the height detecting units of the invention, the controller 7 does the calculating section, and the acceleration sensor 11 does the acceleration detecting unit of the present invention.

In the above-mentioned embodiment and the modification, there was described an example of calculating the pitch angle by detecting respective vehicle heights at the front and rear wheels of the vehicle. Additionally, the pitch angle may be obtained by detecting vehicle heights at two different points in the forward and backward directions of the vehicle and also calculating a distance between two different points.

Again, although the vehicle height sensors are disposed in respective positions of the front and rear wheels in common with the aforementioned embodiment and the above modification, the height sensor may be arranged in either only one of the front and rear positions in a further modification. In such a case, a vehicle height and its initial value on the side of no sensor will be respectively represented by preset designated values for the pitch angle. Then, despite that the calculation accuracy for the pitch angle is slightly lowered in comparison with that of the above-mentioned arrangement where the height sensors are provided in both positions of the vehicle, it is expected to reduce a manufacturing cost of the device since the pitch angle is obtained by the provision of the single sensor.

2nd. Modification of the Embodiment

As mentioned above, the residence time of the current pitch angle range is compared with the residence time of each pitch angle range except the current pitch range in the above-mentioned embodiment and the modification and when a difference between the residence time of the specified pitch angle range and the residence time of the current pitch angle range exceeds the designated threshold value Ts, then the device's recognition is changed from the current pitch angle range to the specified pitch angle range. In case of improving the resolving power of the headlamp autolevelizer as an object to be controlled, however, no change in the threshold value Ts, which is being used in judging whether or not the pitch angle range is changed, would make it impossible to carry out the optical axis control becoming to the required resolving power. That is, in order to enhance the resolving capacity in the optical axis control for the headlamps, it is necessary to reduce the width Δθ for classifying the pitch angle shown in FIG. 2. It should be noted, however, even if classifying the pitch angle so finer, it would be impossible to improve the control accuracy for the position of optical axis unless reducing the designated value Ts used in judging the pitch angle range.

On the other hand, when the designated value TS is decreased corresponding to the required resolving power, then the change of pitch angle range is caused very often, so that there is no sense in providing the switching of pitch angle with such hysteresis errors.

Therefore, according to the second modification, by comparing the residence time of the current pitch angle range on the device's recognition with the residence time of each pitch angle range except the current pitch range, it is executed to judge whether or not the current pitch angle range is recognized correctly. If the present recognition is not correct, then the current pitch angle range is changed into the other one. The constitution of the device in accordance with the second modification is similar to that of FIG. 1 and therefore, the illustration and description are eliminated.

Figure 6:
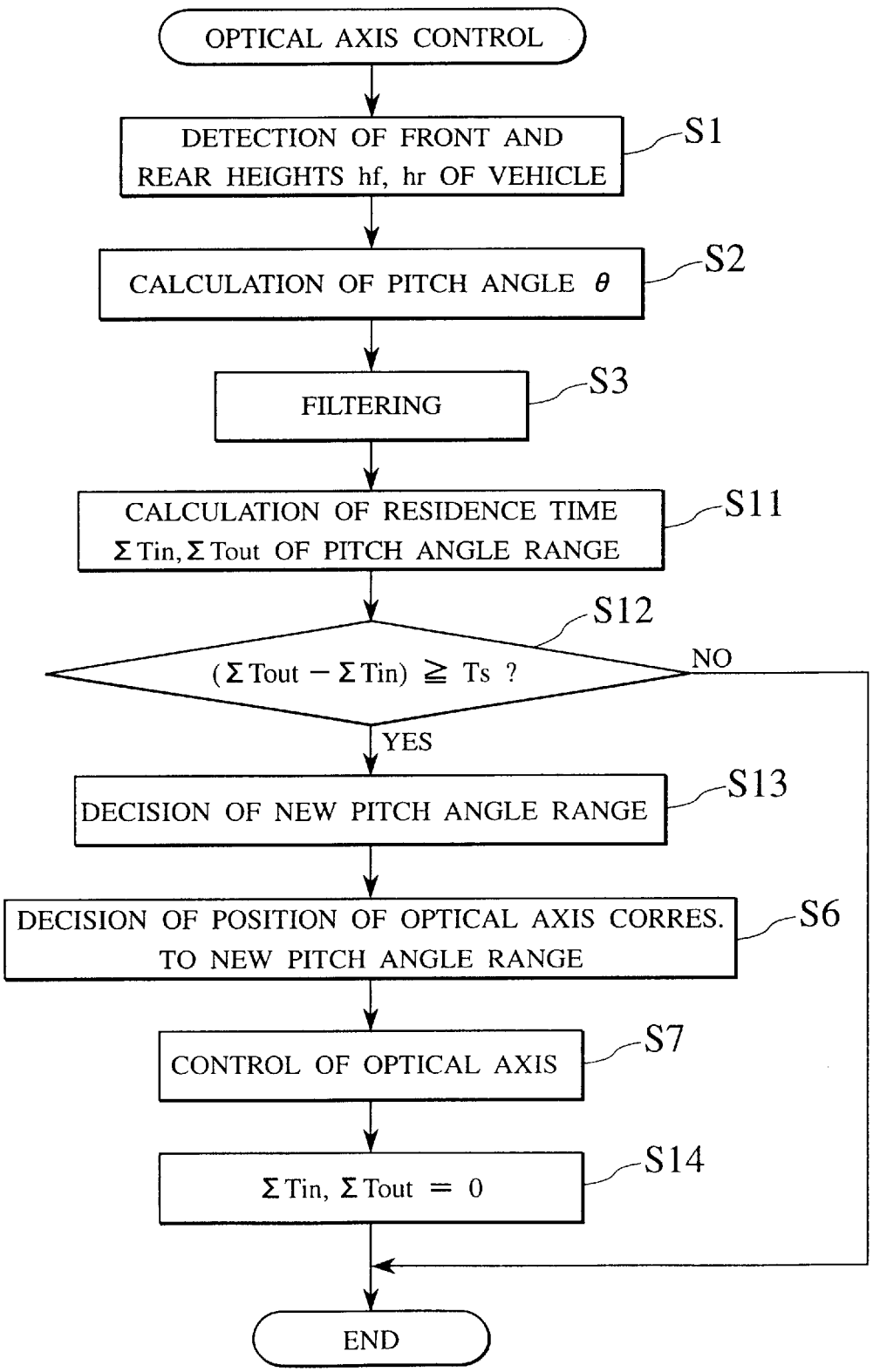
FIG. 6 is a flow chart showing an optical axis control program in accordance with a second modification of the embodiment.

FIG. 6 is a flow chart showing a program for controlling the optical axis in accordance with the second modification. With reference to this flow chart, we now describe an operation of the device in accordance with the second modification. Note, in FIG. 6, some steps to execute processes similar to those of the steps in the control program of FIG. 3 are indicated by the same step numbers respectively and therefore, differences between the former program and the latter program will be described mainly.

The controller 7 executes the optical axis control program at predetermined intervals. At step S1, it is executed to detect the vehicle heights hf, hr by the vehicle height sensors 8, 9. Note, the outputs of the height sensors 8, 9 are not subjected to any filtering process by software. Next, at step S2, it is executed to calculate the pitch angle θ by the expression (2) on the basis of the vehicle heights hf, hr and their preset initial values hfo, hro. At step S3, the calculated pitch angle θ is subjected to the low-pass filtering by software . In this way, since the filtering by software is not applied on the outputs of the sensors 8, 9 but the calculation result of pitch angle, it is possible to delete the misleading pitch angle which is instantaneously produced due to variations of the front and rear vehicle heights during the vehicle's getting over the irregularities or obstacles on the road.

At step S11, it is executed to integrate a residence time ΣTin of the present pitch angle range on the device's current recognition and a residence time ΣTout of the pitch angle ranges besides the present pitch angle range. Note, the residence time ΣTin is the sum total of each residence time of the present pitch angle range on the device's current recognition from the latest change of the pitch angle range till this routine of the optical axis control. On the other hand, the residence time ΣTout is the sum total of each residence time of the pitch angle ranges except the present pitch angle range on the device's current recognition from the latest change of the pitch angle range till this routine of the optical axis control. Note, the integration of residence time is accomplished by adding a routine interval of the optical axis control to the residence time integrated up to the previous routine. Whenever the pitch angle range is changed, the integrated residence times ΣTin, ΣTout are reset to zero, respectively.

At step S12, it is executed to compare the residence time ΣTin of the present pitch angle range on the device's current recognition with the residence time ΣTout of the pitch angle ranges besides the present pitch angle range. When the residence time ΣTout is longer than the residence time ΣTin of the present pitch angle range on the device's current recognition and additionally, a difference between the residence time ΣTout and the residence time ΣTin is equal to or more than the designated value Ts, then the change of pitch angle range is decided. At step S13 to S14 (including steps S6, 7), a new pitch angle range is determined to carry out the optical axis control of the headlamps. On the contrary, when the difference (ΣTout−ΣTin) is less than the value Ts, the routine is ended on judgement that the present pitch angle range on the device's current recognition is correct.

In detail, at step S13, a new pitch angle range is determined in a variety of pitch angle ranges besides the present pitch angle range on the device's current recognition. There are a variety of methods of determining the new pitch angle range. The first method is to establish a pitch angle range which has been detected in the same routine where the change of pitch angle range has been determined, as the new pitch angle range.

We now describe the first method of determining the pitch angle range, taking example by the shown classification for pitch angle range in FIG. 2.

Providing that the pitch angle range on the present recognition is a range from θ2 to θ3, the residence time T23 in the pitch angle range θ2~θ3 from the latest change of pitch angle range up to the current routine is compared with the total sum of the residence times (T01+T12+T34+ . . . ) of the other pitch angle ranges (θ0~θ1, θ1~θ2, θ3~θ4, . . . ). If there is established the following relationship of:

$$\Sigma Tout-\Sigma Tin=[(T01+T12+T34+ \ldots )-T23] \geq Ts \qquad (3),$$

then the change of pitch angle range is determined. Further, if the pitch angle range θ3~θ4 in this routine is detected, the same pitch angle range is determined as the new pitch angle range.

According to the first method, since there is no need to integrate the residence time for every pitch angle range in the other pitch angle ranges besides the recognized pitch angle range, it is possible to lighten the burden of the microcomputer owing to the reduced number of integrating processes, whereby the time for integration can be shortened.

The second method is to establish a pitch angle range which has the longest residence time in the period from the latest change of the pitch angle range till the present routine, as the new pitch angle range.

If the change of pitch angle range is determined by the establishment of the above relationship (3) in the example shown in FIG. 2, it is executed to examine each residence time (T01, T12, T34, . . . ) of the other pitch angle ranges (θ0~θ1, θ1~θ2, θ3~θ4, . . . ) and sequentially determine the pitch angle range having the longest residence time as the new pitch angle range. Note, in case of adopting the second method, it will be executed to integrate the residence time of the other pitch angle ranges (θ0~θ1, θ1~θ2, θ3~θ4, . . .) at step S11.

According to the second method, it is possible to obtain the pitch angle range closer to the actual pitch angle range that that obtained in the first method through the integration period gets longer due to the need to integrate the residence time for every pitch angle range.

Then, at step S6, it is executed to determine the positions of the optical axes of the headlamps corresponding to the new pitch angle range and finally, the routine goes to step S7 where the optical axes are controlled by the control circuits 5, 6. At next step S14, the residence time $\Sigma$Tout and the residence time $\Sigma$Tin are reset to zero, respectively. Note, in case of the above-mentioned second method, all of the residence times of the respective pitch angle ranges will be reset to zero.

In this way, according to the modification, since it is executed to judge whether the current pitch angle range on the device's recognition is correct by comparing the residence time of the current pitch angle range with those of the other pitch angle ranges and sequent change the current pitch angle range to the other in case of the wrong recognition, it is not always necessary to reduce the changing hysteresis (threshold value) Ts against the requirement of increasing the resolving power in controlling the optical axes of the headlamps, so that an optional value can be established for the changing hysteresis. That is, since an optional value for the hysteresis TS can be established irrespective of the resolving power, it is possible to carry out the calculation of pitch angle suitable to the object to be controlled. For example, if a large value is prepared for the hysteresis Ts, then it is possible to exclude the unnecessary switching of the pitch angle range due to the vehicle's getting over the obstacles etc. and the noise mixed into the vehicle height sensor(s). Conversely, if a small value is prepared for the hysteresis Ts, it is possible to allow the calculation result of the pitch angle range to follow the actual change in pitch angle, precisely.

3rd. Modification of the Embodiment

In the above-mentioned second modification, a single designated value Ts is employed in judging to change the pitch angle range in both cases that the pitch angle increases and decreases. Now, we describe the third modification of the embodiment where different designated values are prepared in judging to change the pitch angle range in both cases that the pitch angle increases and decreases. The constitution of the device in accordance with the third modification is similar to that of FIG. 1 and therefore, the illustration and description are eliminated.

Figure 7:
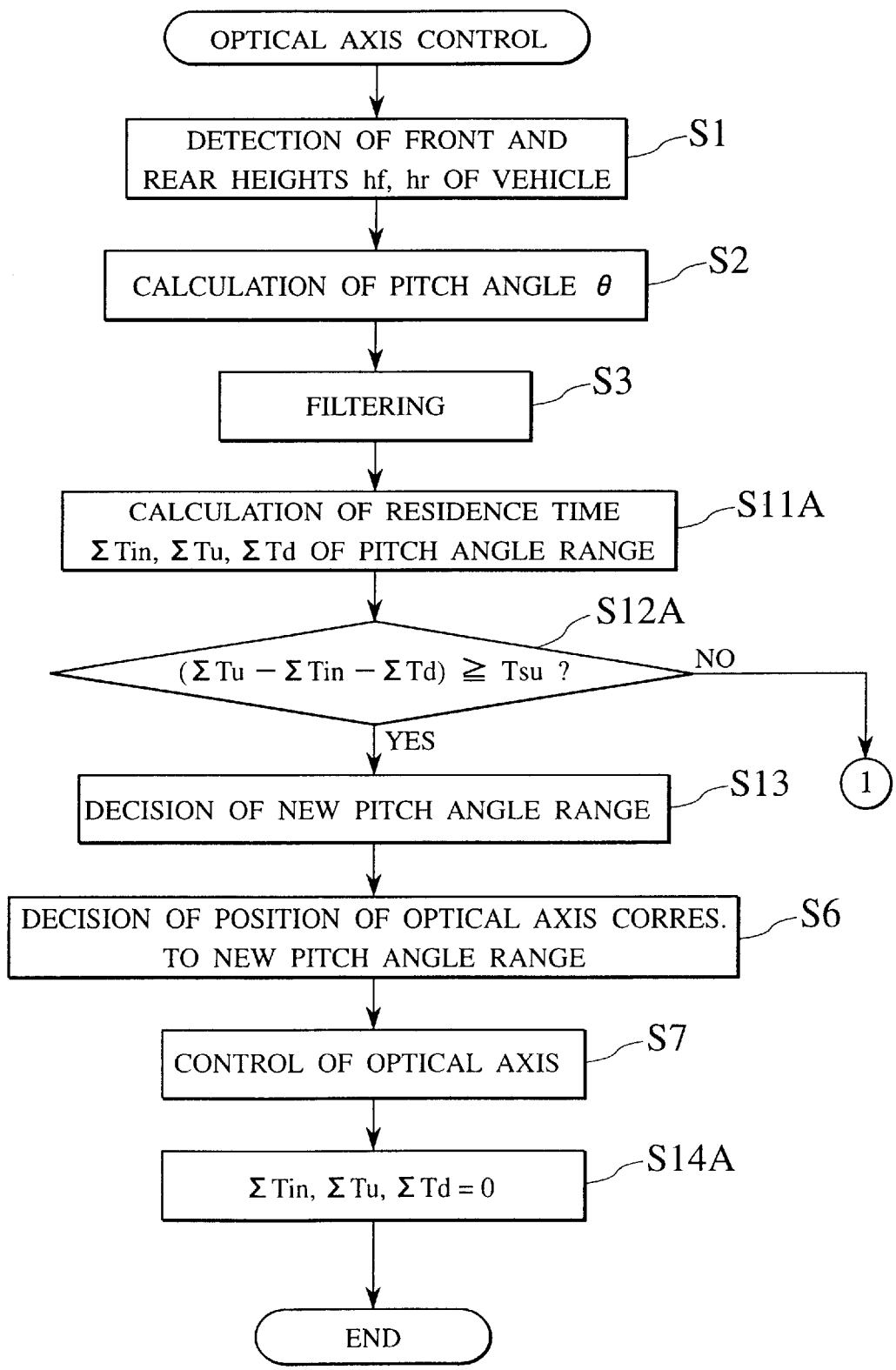
FIG. 7 is a flow chart showing an optical axis control program in accordance with a third modification of the embodiment.
Figure 8:
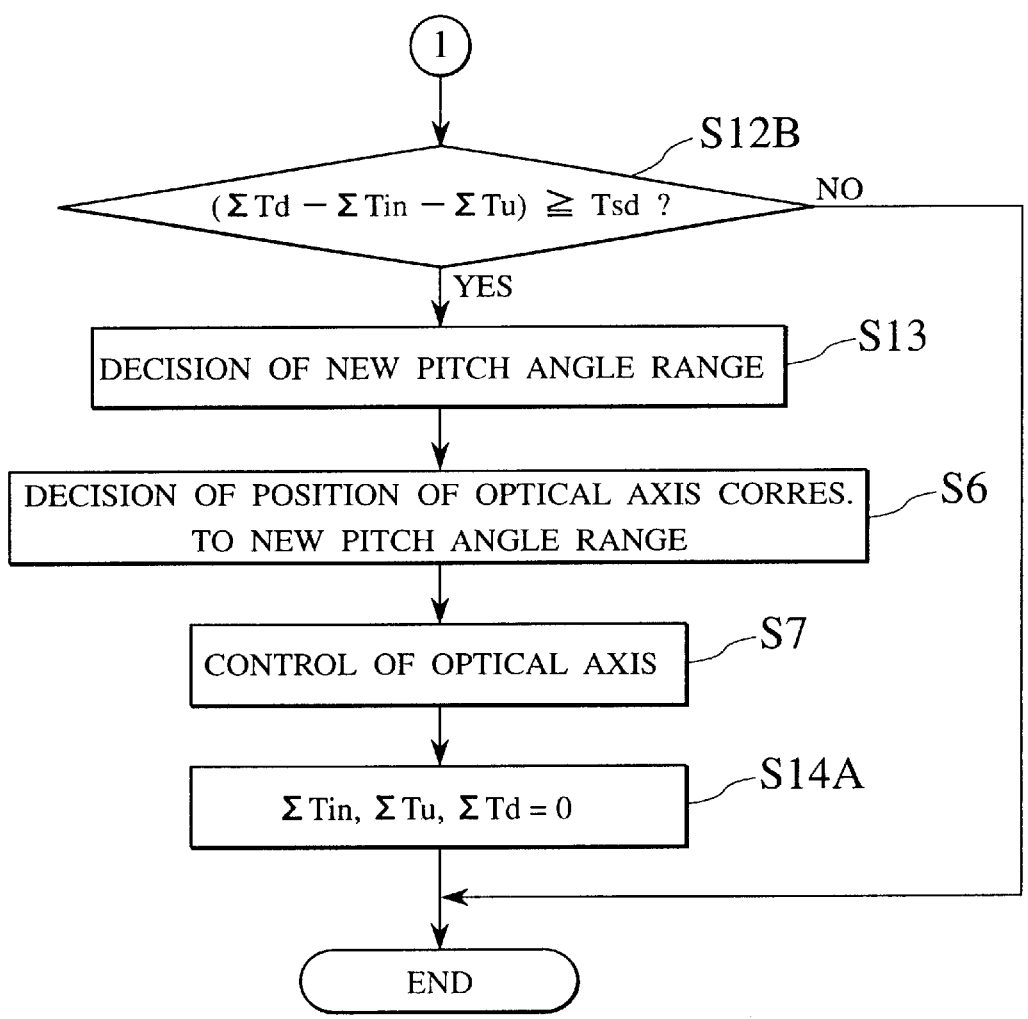
FIG. 8 is a remaining part of the flow chart showing the optical axis control program in accordance with the third modification of the embodiment.

FIGS. 7 and 8 shows a flow chart showing a program for controlling the optical axis in accordance with the third modification. With reference to this flow chart, we now describe an operation of the device in accordance with the third modification. Note, in the figures, some steps to execute processes similar to those of the steps in the control program of FIG. 3 are indicated by the same step numbers respectively and therefore, differences between the former program and the latter program will be described mainly.

The controller 7 executes the optical axis control program at predetermined intervals. At step S1, it is executed to detect the vehicle heights hf, hr by the vehicle height sensors 8, 9. Note, the outputs of the height sensors 8, 9 are not subjected to any filtering process by software. Next, at step S2, it is executed to calculate the pitch angle $\theta$ by the expression (2) on the basis of the vehicle heights hf, hr and their preset initial values hfo, hro. At step S3, the calculated pitch angle $\theta$ is subjected to the low-pass filtering by software. Also in this modification, since the filtering by software is not applied on the outputs of the sensors 8, 9 but the calculation result of pitch angle, it is possible to delete the misleading pitch angle which is instantaneously produced due to variations of the front and rear vehicle heights during the vehicle's getting over the irregularities or obstacles on the road.

At step S11A, it is executed to integrate a residence time $\Sigma$Tin of the present pitch angle range ($\theta$in) on the device's current recognition, a residence time $\Sigma$Tu of the pitch angle range ($\theta$u) larger than the present pitch angle range ($\theta$in), and a residence time $\Sigma$Td of the pitch angle range ($\theta$d) smaller than the present pitch angle range ($\theta$in) s besides the present pitch angle range. As mentioned before, the residence time $\Sigma$Tin is the sum total of each residence time of the present pitch angle range ($\theta$in) on the device's current recognition from the latest change of the pitch angle range till this routine of the optical axis control. On the other hand, the residence time $\Sigma$Tu is the sum total of each residence time of the pitch angle range ($\theta$u) larger than the present pitch angle range ($\theta$in) from the latest change of the pitch angle range till this routine of the optical axis control. Again, the residence time $\Sigma$Td is the sum total of each residence time of the pitch angle range ($\theta$d) smaller than the present pitch angle range ($\theta$in) from the latest change of the pitch angle range till this routine of the optical axis control. Providing that the present pitch angle range ($\theta$in) is identical to the shown range from $\theta 2 \sim \theta 3$ in FIG. 2, then the pitch angle range ($\theta$u) will be the shown ranges $\theta 3 \sim \theta 4$, $\theta 4 \sim \ldots$, while the pitch angle range ($\theta$d) will be the shown ranges $\theta 0 \sim \theta 1$ and $\theta 1 \sim \theta 2$. Note, whenever the pitch angle range is changed, the integrated residence times $\Sigma$Tin, $\Sigma$Tu and $\Sigma$Td are reset to zero, respectively.

At step S12A, it is executed to compare the residence time $\Sigma$Tu of the larger pitch angle range ($\theta$u) with the residence time ($\Sigma$Tin+$\Sigma$Td) of the present and smaller pitch angle ranges ($\theta$in+$\theta$d) and sequentially judge whether the following relationship is established:

$$(\Sigma Tu - \Sigma Tin - \Sigma Td) \geq Tsu \qquad (4)$$

Thus, when the above relationship (4) is established while the residence time $\Sigma$Tu is longer than the residence time ($\Sigma$Tin+$\Sigma$Td) and a difference therebetween is more than a designated value Tsu in the direction to increase the pitch angle range, then it is determined to change the current pitch angle range to the direction to increase the pitch angle range, based on a judgement that the pitch angle range presently recognized is not correct. Then, at steps 13 to 14A, the new pitch angle range is determined to carry out the optical axis control for headlamps corresponding to the determined pitch angle range. On the other hand, when the relationship (4) is not established, then the routine goes to step S12B.

At step S13, the new pitch angle range is determined from the pitch angle ranges larger than the present pitch angle range on the device's current recognition. The method of determining the new pitch angle range are similar to the aforementioned first and second methods in the second modification. Thus, the first method is to establish a pitch angle range which has been detected in the same routine where the change of pitch angle range has been determined, as the new pitch angle range. The second method is to establish a pitch angle range which has the longest residence time in the period from the latest change of the pitch angle range till the present routine, as the new pitch angle range. Therefore, explanations as to these methods are eliminated.

Then, at step S6, it is executed to determine the positions of the optical axes of the headlamps corresponding to the new pitch angle range and finally, the routine goes to step S7 where the optical axes are controlled by the control circuits 5, 6. At next step S14A, the residence times $\Sigma$Tin, $\Sigma$Tu and $\Sigma$Td are reset to zero, respectively.

When the above relationship (4) is not established, then the routine goes to step S12B. At step S12B, it is executed to compare the residence time $\Sigma$Td of the smaller pitch angle range ($\theta$d) with the residence time ($\Sigma$Tin+$\Sigma$Tu) of the present and smaller pitch angle ranges ($\theta$in+$\theta$u) and sequentially judge whether the following relationship is established:

$$(\Sigma Td - \Sigma Tin - \Sigma Tu) - \geq Tsd \qquad (5)$$

Thus, when the above relationship (5) is established while the residence time $\Sigma Td$ is longer than the residence time ($\Sigma Tin + \Sigma Tu$) and a difference therebetween is more than a designated value Tsd in the direction to decrease the pitch angle range, then it is determined to change the current pitch angle range to the direction to decrease the pitch angle range, based on a judgement that the pitch angle range presently recognized is not correct. Then, at steps S13 to S14A, the new pitch angle range is determined to carry out the optical axis control for headlamps corresponding to the determined pitch angle range.

At step S13, the new pitch angle range is determined within the pitch angle ranges smaller than the present pitch angle range on the device's current recognition. The method of determining the new pitch angle range are similar to the aforementioned first and second methods in the second modification. Thus, the first method is to establish a pitch angle range which has been detected in the same routine where the change of pitch angle range has been determined, as the new pitch angle range. The second method is to establish a pitch angle range which has the longest residence time in the period from the latest change of the pitch angle range till the present routine, as the new pitch angle range. Therefore, explanations as to these methods are eliminated.

Then, at step S6, it is executed to determine the positions of the optical axes of the headlamps corresponding to the new pitch angle range and finally, the routine goes to step S7 where the optical axes are controlled by the control circuits 5, 6. At next step S14A, the residence times $\Sigma Tin$, $\Sigma Tu$ and $\Sigma Td$ are reset to zero, respectively.

Note, when the relationships (4) and (5) are not established, the pitch angle range is not changed and the routine is ended with no change in pitch angle range, based on a judgement that the current pitch angle range is correct.

In this way, according to this modification of the embodiment, since the different hysteresis is established in each of the cases that the pitch angle range increases and decreases, it is possible to carry out the pitch angle calculation suitable to the object to be controlled. For example, a relationship of Tsu>Tsd is established in the application for the headlamp auto-levelizer, so that when the pitch angle increases, a priority is given to recognize the pitch angle range correctly and prevent the pitch angle range from changing frequently. On the contrary, in the direction to decrease the pitch angle, although the pitch angle range frequently changes to some extent, the optical axes of the headlamps are raised as soon as the vehicle has been inclined in font, whereby it is possible to prevent the front irradiation area of the vehicle from getting narrower.

4th. Modification of the Embodiment

We now describe the fourth modification of the embodiment where the headlamps are driven to an optical position corresponding to the detected pitch angle range without executing to judge the change of pitch angle range as soon as the pitch angle is lowered since the front side of the vehicle sinks or the rear side of the vehicle rises. The constitution of the device in accordance with the fourth modification is similar to that of FIG. 1 and therefore, the illustration and description are eliminated.

Figure 9:
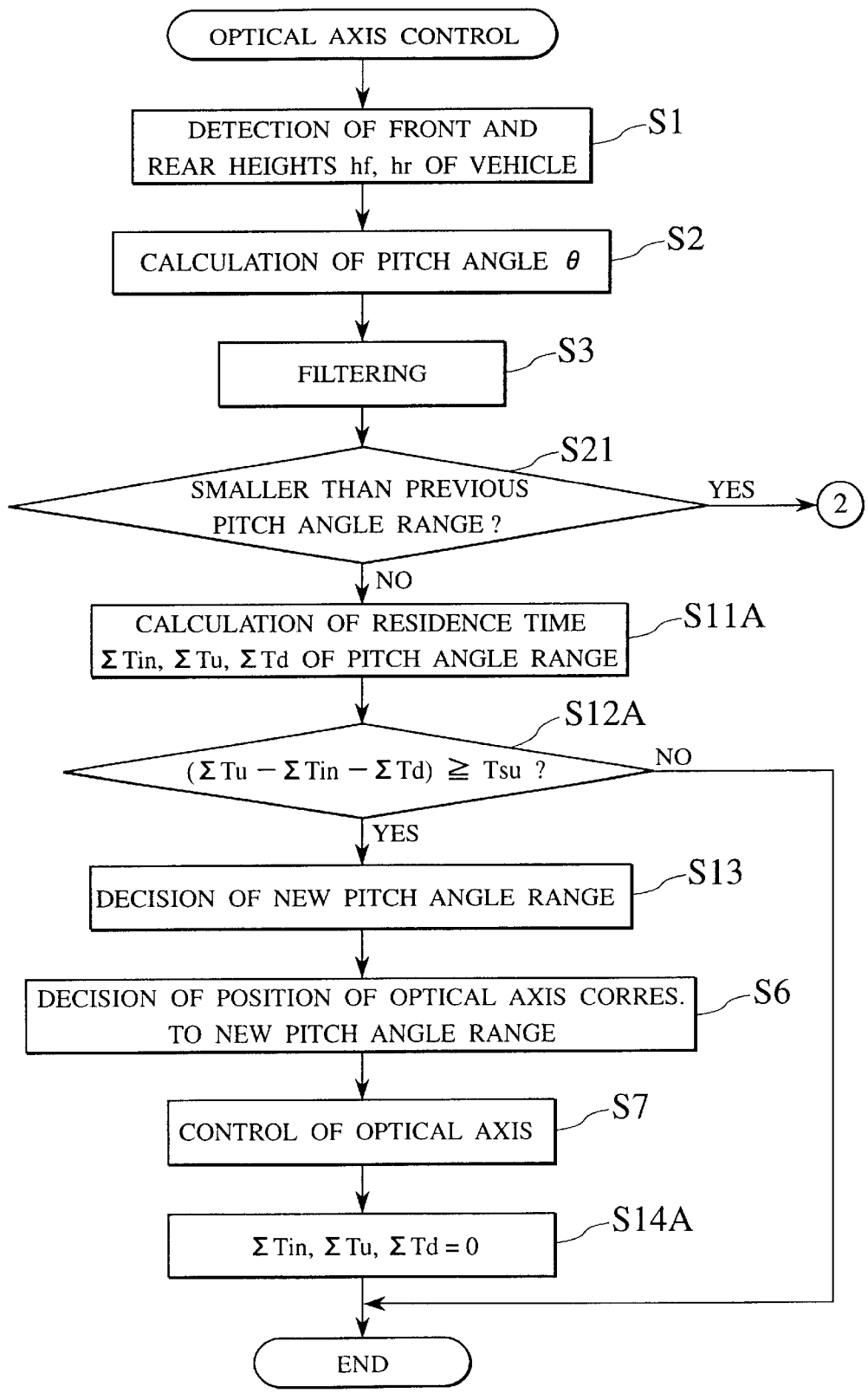
FIG. 9 is a flow chart showing an optical axis control program in accordance with a fourth modification of the embodiment.

FIGS. 9 and 10 shows a flow chart showing a program for controlling the optical axis in accordance with the fourth modification. With reference to this flow chart, we now describe an operation of the device in accordance with the fourth modification. Note, in the figures, some steps to execute processes similar to those of the steps in the control program of FIG. 3 are indicated by the same step numbers respectively and therefore, differences between the former program and the latter program will be described mainly.

The controller 7 executes the optical axis control program at predetermined intervals. At step S1, it is executed to detect the vehicle heights hf, hu by the vehicle height sensors 8, 9. Note, the outputs of the height sensors 8, 9 are not subjected to any filtering process by software. Next, at step S2, it is executed to calculate the pitch angle $\theta$ by the expression (2) on the basis of the vehicle heights hf, hr and their preset initial values hfo, hro. At step S3, the calculated pitch angle $\theta$ is subjected to the low-pass filtering by software. Also in this modification, since the filtering by software is not applied on the outputs of the sensors 8, 9 but the calculation result of pitch angle, it is possible to delete the misleading pitch angle which is instantaneously produced due to variations of the front and rear vehicle heights during the vehicle's getting over the irregularities or obstacles on the road.

At step S21, it is judged whether or not the pitch angle range detected in this routine is smaller than that detected in the previous routine. When detecting the smaller pitch angle range than that in the previous routine, the present routine goes to step S22 to establish the presently-detected pitch angle range as the new pitch angle range. Then, at step S6, it is executed to determine the positions of the optical axes of the headlamps corresponding to the new pitch angle range and finally, the routine goes to step S7 where the optical axes are controlled by the control circuits 5, 6. At next step S14A, the residence times $\Sigma Tin$, $\Sigma Tu$ and $\Sigma Td$ are reset to zero, respectively.

When it is judged at step S21 that the pitch angle range detected in this routine is more than the pitch angle range detected in the previous routine, the routine goes to step S11A. At step S11A, it is executed to integrate a residence time $\Sigma Tin$ of the present pitch angle range ($\theta in$) on the device's current recognition, a residence time $\Sigma Tu$ of the pitch angle range ($\theta u$) larger than the present pitch angle range ($\theta$ in), and a residence time $\Sigma Td$ of the pitch angle range ($\theta d$) smaller than the present pitch angle range ($\theta$ in). At step S12A, it is executed to judge whether to change the pitch angle range in the direction to increase the pitch angle range. Then, at steps S13 to S14A, the new pitch angle range is determined to carry out the optical axis control for headlamps corresponding to the determined pitch angle range. Note, we eliminate the explanations about the processes from steps S13 to S14A since they are similar to those of the third modification.

In this way, according to the modification, when the pitch angle range detected in the present routine is less than the pitch angle range detected in the previous routine, the headlamps are immediately actuated for the optical axis positions corresponding to the detected pitch angle range, based on the judgement that the front side of the vehicle sinks or the rear side of the vehicle rises. Thus, when the vehicle is inclined in front, the optical axes can be immediately raised thereby to prevent the front irradiation area from getting narrower.

Note, in the second to fourth modifications, the residence time in case of zero in the forward and backward acceleration of the vehicle may be integrated, as mentioned in the first modification of the embodiment.

In the second to fourth modifications, the vehicle height sensors 8, 9 constitute the height detecting units, while the controller 7 constitutes the calculating section of the invention.

The entire contents of the Japanese Patent Applications P10-240178 (filed Aug. 26, 1998) is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A pitch angle calculating device for a vehicle, comprising:

height detecting units arranged both in a front position and in the rear position of the vehicle, for detecting a vehicle height of the front position and a vehicle height of the rear position; and a calculating section for calculating a pitch angle of the vehicle by the vehicle heights and a distance between the front position and the rear position;

wherein, on condition that the pitch angle is divided into a plurality of pitch angle ranges, the calculating section integrates periods residing in each pitch angle range and subsequently determines the pitch angle of the vehicle on a basis of the integrated periods referred as "residence time".

2. A pitch angle calculating device for a vehicle, comprising:

a height detecting unit arranged in either one of a front position and the rear position of the vehicle, for detecting either a vehicle height of the front position or a vehicle height of the rear position; and a calculating section for calculating a pitch angle of the vehicle by the vehicle heights and a distance between the front position and the rear position;

wherein, on conditions that the other of the vehicle heights is established by a fixed value and that the pitch angle is divided into a plurality of pitch angle ranges, the calculating section integrates periods residing in each pitch angle range and subsequently determines the pitch angle of the vehicle on a basis of the integrated periods referred as "residence time".

3. The pitch angle calculating device of claim 2, wherein the calculating section chances the current pitch angle of the vehicle when a difference between the residence time of the current pitch angle range and the other residence time of the other pitch angle range exceeds a designated value.

4. The pitch angle calculating device of claim 3, wherein the designated value established in case that the pitch angle of the vehicle increases is different from the designated value established in case that the pitch angle of the vehicle decreases.

5. The pitch angle calculating device of claim 2, wherein the calculating section determines to change the current pitch angle range adopted at present when a residence time of the other pitch angle range besides the current pitch angle range is longer than the residence time of the current pitch angle range by a designated value, in a period from a time when the previous pitch angle was changed to the current pitch angle up to now.

6. The pitch angle calculating device of claim 2, wherein the calculating section determines whether to change the current pitch angle range to an increased side, thereof or to change the current pitch angle range to the decreased side, based on the residence time of the current pitch angle range, the residence time of the larger pitch angle range and the residence time of the smaller pitch angle range, in a period from a time when the previous pitch angle was changed to the current pitch angle up to now.

7. The pitch angle calculating device of claim 6, wherein the calculating section changes the current pitch angle range to the increased side when the residence time of the larger pitch angle range is longer than the residence time of the smaller pitch angle range by a first designated value, while the calculating section changes the current pitch angle range to the decreased side when the residence time of the smaller pitch angle range is longer than the residence time of the larger pitch angle range by a second designated value.

8. The pitch angle calculating device of claim 7, wherein the second designated value is smaller than the first designated value.

9. The pitch angle calculating device of claim 5, wherein the calculating section directs the device's recognition toward the pitch angle range calculated at a point of time of determining to change the pitch angle range.

10. The pitch angle calculating device of claim 5, wherein the calculating section directs the device's recognition toward the pitch angle range having the longest residence time at a point of time of determining to change the pitch angle range.

11. The pitch angle calculating device of claim 1, wherein when a recognition area for the pitch angle is lowered since a front part of the vehicle sinks or the rear part of the vehicle rises, the calculating section immediately changes its recognition against the lowered pitch angle range.

12. The pitch angle calculating device of claim 2, wherein the calculating section does not apply a filtering process of software on outputs of the height detecting units but applies the filtering process of software on the calculated pitch angle.

13. The pitch angle calculating device of claim 2, wherein the calculating section does not apply a filtering process of software on an output of the height detecting unit but applies the filtering process of software on the calculated pitch angle.

14. The pitch angle calculating device of claim 2, further comprising an acceleration detecting unit for detecting acceleration of the vehicle, wherein the calculating section calculates the residence time when the detected acceleration is substantially equal to zero.

15. The pitch angle calculating device of claim 1, wherein the vehicle height detecting units detect angles of respective suspension arms for front and rear wheels of the vehicle and convert the detected angles into the vehicle heights.

16. The pitch angle calculating device of claim 2, wherein the vehicle height detecting unit detects an angle of a suspension arms for either one of front and rear wheels of the vehicle and converts the detected angle into the vehicle height.

* * * * *